(12) United States Patent
Otsuka et al.

(10) Patent No.: US 8,740,009 B2
(45) Date of Patent: Jun. 3, 2014

(54) TANK AND MANUFACTURING METHOD THEREOF

(75) Inventors: Riki Otsuka, Toyota (JP); Motohiro Mizuno, Toyota (JP); Hirokazu Otsubo, Toyota (JP); Shinichi Nomura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/263,640

(22) PCT Filed: Apr. 10, 2009

(86) PCT No.: PCT/JP2009/057357
§ 371 (c)(1),
(2), (4) Date: Nov. 1, 2011

(87) PCT Pub. No.: WO2010/116528
PCT Pub. Date: Oct. 14, 2010

(65) Prior Publication Data
US 2012/0048862 A1    Mar. 1, 2012

(51) Int. Cl.
*F17C 1/06* (2006.01)
*F17C 1/04* (2006.01)

(52) U.S. Cl.
CPC ... *F17C 1/06* (2013.01); *F17C 1/04* (2013.01); *F17C 2203/011* (2013.01)
USPC .............................. 220/589; 220/588; 29/446

(58) Field of Classification Search
CPC ................ F17C 1/06; F17C 1/04; F17C 1/02; F17C 1/16; F17C 2203/011; F17C 2203/01; F17C 2209/2163; F17C 2209/2154
USPC ......... 220/589, 588, 586, 581; 156/188, 187, 156/185, 184; 493/95, 93, 84; 428/36.3, 428/35.7

IPC ............... F17C 1/06; B29C 63/10,63/08, 70/08
See application file for complete search history.

(56) References Cited

U.S. PATENT DOCUMENTS 2,331,504 A * 10/1943 Raymond et al. ............... 29/446
2,372,723 A    4/1945 Jasper
(Continued)

FOREIGN PATENT DOCUMENTS

DE    3821852 A1 * 2/1990 ................ F17C 1/02
JP    08-131588 A    5/1996
(Continued)

OTHER PUBLICATIONS

Translation of Yamada (JP-09004712), Jul. 1, 1997, pp. 2-4.*
(Continued)

*Primary Examiner* — Robert J Hicks
(74) *Attorney, Agent, or Firm* — Kenyon & Kenyon LLP

(57) ABSTRACT

A tank that includes layers of fiber reinforced plastics (FRP) formed by alternately winding hoop and helical bundles of fiber over its outer surface. The winding produces stepped portions, i.e. unevenness, in a helical layer positioned as the innermost layer. Such unevenness affects an outer layer (especially a hoop layer) directly adjacent to the innermost helical layer and lowers fatigue strength of the adjacent outer layer. In order to prevent this fatigue strength decrease, the bundle of fiber used for the innermost helical layer has a smaller sectional area than the bundles used for the outer layers. Consequently, decreasing the sectional area of the innermost helical bundle decreases the stepped portions, which, in turn, decreases the transfer of unevenness to the outer layer (especially a hoop layer) directly adjacent to the helical layer. As a result, fatigue strength of the adjacent outer layer (especially a hoop layer) increases.

4 Claims, 8 Drawing Sheets

(56) References Cited

U.S. PATENT DOCUMENTS

| | | | | |
|---|---|---|---|---|
| 2,718,583 | A | * | 9/1955 | Noland et al. ............... 392/458 |
| 2,744,043 | A | * | 5/1956 | Ramberg .................... 156/155 |
| 3,033,724 | A | * | 5/1962 | Stokes ....................... 156/187 |
| 3,886,029 | A | * | 5/1975 | Poulsen ...................... 242/444 |
| 5,120,384 | A | * | 6/1992 | Yoshimitsu et al. ......... 156/242 |
| 2008/0254153 | A1 | * | 10/2008 | Wang et al. ................. 424/729 |
| 2009/0314785 | A1 | * | 12/2009 | Cronin et al. ............... 220/590 |

FOREIGN PATENT DOCUMENTS

| | | | |
|---|---|---|---|
| JP | 08-216277 | A | 8/1996 |
| JP | 09-004712 | A | 1/1997 |
| JP | 09-203496 | A | 8/1997 |
| JP | 11-019257 | A | 1/1999 |
| JP | 2000-313069 | A | 11/2000 |
| JP | 2001-141191 | A | 5/2001 |
| JP | 2005-106227 | A | 4/2005 |
| JP | 2005-337272 | A | 12/2005 |
| JP | 2006-062355 | A | 3/2006 |
| JP | 2008-032088 | A | 2/2008 |
| JP | 2008-143029 | A | 6/2008 |
| JP | 2008-304038 | A | 12/2008 |

OTHER PUBLICATIONS

Translation of Miyasoi (JP 09-203496), May 8, 1997, p. 3.*
Translation of Stadler et al. (DE 3821852), Feb. 22, 1990, Figure.*
International Search Report mailed Jul. 28, 2009 of PCT/JP2009/057357.

* cited by examiner

TANK AND MANUFACTURING METHOD THEREOF

This is a 371 national phase application of PCT/JP2009/057357 filed 10 Apr. 2009, the contents of which are incorporated herein by reference.

TECHNICAL FIELD

The present invention relates to a tank and a manufacturing method thereof, and more particularly, it relates to the improvement of a structure in a tank filled with a hydrogen gas or the like with a high pressure.

BACKGROUND ART

As a tank which is utilized for the storage of hydrogen or the like, there has been utilized a tank including a fiber reinforced plastics (FRP) layer formed by alternately laminating hoop layers and helical layers on the outer periphery of a liner (see e.g. Patent Document 1). The hoop layer is a layer formed by hoop-winding a bundle of fibers (e.g. carbon fibers) (a winding way of winding the bundle around a tank trunk part almost vertically to a tank axis), and the helical layer is a layer formed by helically winding a bundle of fibers such as carbon fibers (CF) (a winding way of winding the bundle up to a tank dome part almost in parallel with the tank axis) (see FIG. 2 of the present application).

PRIOR ART DOCUMENT

Patent Documents

Patent Document 1 JP 2008-032088 A

DISCLOSURE OF THE INVENTION

Problems to be Solved by the Invention

However, a conventional technology described above has a problem that owing to a stepped portion of the surface of helical layer positioned in an inner layer of an FRP layer, especially the stepped portion of the surface of the helical layer positioned in the innermost layer, a fatigue strength of a layer (especially a hoop layer) which is adjacent to the outside of the helical layer lowers.

Therefore, an object of the present invention is to provide a tank having a structure which can avoid a phenomenon where owing to an influence of a stepped portion of the surface of a helical layer positioned in an inner layer of an FRP layer, a fatigue strength of a layer (especially a hoop layer) adjacent to the outside of the helical layer lowers, and to provide a manufacturing method of the tank.

Means for Solving the Problems

To solve such problems, the present inventors have performed various investigations, and have found that when a structural bend of a fiber bundle of the above hoop layer is large, a fatigue strength of the hoop layer lowers. That is, when the hoop layers and helical layers are laminated to form an FRP layer and unevenness occurs in the helical layer itself which is adjacent to the hoop layer, the unevenness is transferred to the adjacent hoop layer. In consequence, a fiber bundle itself of the hoop layer little meanders to generate undulations, and bends (the undulations) due to a structure are generated in the hoop layer.

Under such situations, the present inventors have performed investigations on how to decrease the structural bends (undulations) which might be generated in the fiber bundle of the hoop layer, and have obtained a new finding which results in the solution of such a problem. On the basis of such finding, the present invention provides a tank comprising a liner, and an FRP layer including hoop layers and helical layers alternately formed by winding fiber bundles around the outer periphery of the liner, wherein in at least one of a plurality of helical layers positioned in an inner layer of the FRP layer, a sectional area of the fiber bundle constituting the helical layer is smaller than that of the fiber bundle constituting another layer formed outside the helical layer.

As means for decreasing the bends (the undulations) of the fiber bundle of the hoop layer due to the structure, it has been considered that the unevenness of the adjacent helical layer is decreased to prevent the unevenness from being transferred. However, as described above, fibers in the helical layer are wound almost in parallel with a tank axis to be folded back in a tank dome part (see FIG. 2), such winding as to eliminate a space between the adjacent fiber bundles is not especially considered, and it is fundamentally difficult to decrease the bends. Usually, the overlap of the fiber bundles with one another, the arrangement of the fiber bundles, or the like in the helical layer is not taken into consideration, and the fibers are wound in a so-called disorder manner. Heretofore, it has been suggested that, for example, a phase of a reinforcing fiber bundle of each helical layer in a cylindrical member peripheral direction is shifted, but there has not been any suggestion or aiming that a helical layer which does not have any unevenness or has only little unevenness is formed.

In this respect, according to the present invention, at least one of a plurality of helical layers positioned in the inner layer of the FRP layer, the sectional area of the fiber bundle constituting the helical layer is set to be smaller than that of the fiber bundle constituting another layer formed outside the helical layer, thereby decreasing the unevenness of the helical layer. That is, when the helical layer is formed by using the fiber bundle having such a small sectional area, a thickness of the fiber bundle, accordingly, decreases, which decreases a height of the fiber bundle. Moreover, a space between the fiber bundles also becomes small. Therefore, the unevenness of the helical layer, accordingly, becomes small, and the unevenness can be prevented from being transferred to the other layer (e.g. the hoop layer) formed outside the helical layer. In consequence, it is possible to decrease conventional structural fiber bundle bends due to an uneven helical layer (indicating the helical layer which is not subjected to any treatment for smoothing the surface thereof and has the unevenness occurring on the surface, as denoted with mark 70B in FIG. 11 and FIG. 12). Therefore, when the structural bends (undulations) of the fiber bundles of the layer (e.g. the hoop layer) formed outside the helical layer are suppressed, the fatigue strength of the fiber bundle itself can be enhanced. Moreover, when the helical layer and the layer (e.g. the hoop layer) formed outside the helical layer have a decreased thickness and an increased fiber volume content ratio (Vf), a burst strength can be enhanced.

In the tank according to the present invention, the helical layer positioned in the inner layer is preferably the helical layer of the innermost layer. Usually, in the fiber bundle layers (the helical layer and the hoop layer), the layer positioned on an inner side (the layer closer to the liner) has a larger degree of contribution to the tank strength. In this respect, when the helical layer of the innermost layer is constituted of the fiber bundle having a small sectional area as in the present invention, the layer (e.g. the hoop layer) which is adjacent to the outside of the innermost helical layer can smoothly be wound. The structural bends (undulations) of the fiber bundle of the layer are suppressed, which can contribute to the enhancement of the tank strength.

Moreover, in the tank according to the present invention, the sectional area of the fiber bundle is preferably set by changing the number of fibers constituting the fiber bundle. When a plurality of fibers are bundled to constitute the fiber bundle and the number of the fibers is decreased, the sectional area of the fiber bundle can, accordingly, be decreased.

Furthermore, in the tank according to the present invention, a tensile force onto the fiber bundle constituting the helical layer is preferably increased to decrease a thickness of the fiber bundle in a laminating direction of the FRP layer. When the thickness of the fiber bundle is decreased to flatten the fiber bundle, the unevenness of the helical layer is, accordingly, decreased, and the unevenness can be prevented from being transferred to the other layer (e.g. the hoop layer) formed outside the helical layer.

Moreover, as the fiber bundle constituting the other layer formed outside the helical layer, the fiber bundle having a larger diameter than a fiber bundle constituting another layer is preferably used. When the diameter of the fiber bundle of the other layer formed outside the helical layer is increased in this manner, a bend displacement of the fiber bundle is decreased, and an exerted shear stress can be alleviated.

A manufacturing method according to the present invention is a manufacturing method of a tank including a liner, and an FRP layer constituted of hoop layers and helical layers alternately formed by winding fiber bundles around the outer periphery of the liner, comprising the steps of: forming at least one of a plurality of helical layers positioned in an inner layer of the FRP layer by winding the fiber bundle having a sectional area which is smaller than that of the fiber bundle constituting another layer formed outside the helical layer.

Furthermore, a cylindrical member according to the present invention is a cylindrical member comprising an FRP layer including hoop layers and helical layers alternately formed by winding fiber bundles, wherein in at least one of a plurality of helical layers positioned in an inner layer of the FRP layer, a sectional area of the fiber bundle constituting the helical layer is smaller than that of the fiber bundle constituting another layer formed outside the helical layer.

Effect of the Invention

According to the present invention, it is possible to avoid a phenomenon where owing to an influence of a stepped portion of the surface of a helical layer positioned in an inner layer of an FRP layer, a fatigue strength of a layer (especially a hoop layer) adjacent to the outside of the helical layer lowers.

DETAILED DESCRIPTION OF THE INVENTION

Figure 1:
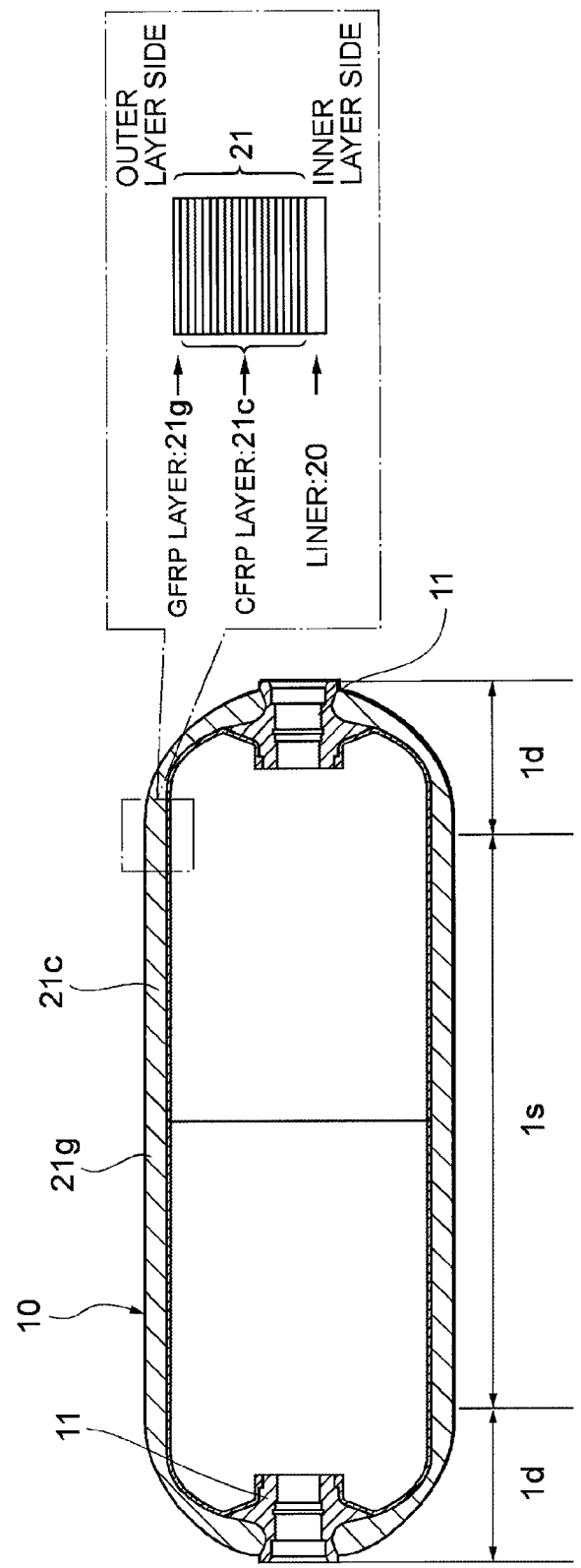
FIG. 1 shows a sectional view and a partially enlarged view showing a structure of a tank in an embodiment of the present invention.

Hereinafter, a constitution of the present invention will be described in detail with respect to an example of a mode for carrying out the invention shown in drawings.

FIG. 1 to FIG. 4 and the like show an embodiment of a tank according to the present invention and a manufacturing method of the tank. Hereinafter, there will be described illustration of a case where a tank (hereinafter also referred to as the high-pressure tank) 1 according to the present invention is applied to a high-pressure hydrogen tank as a hydrogen fuel supply source. The hydrogen tank can be utilized in a fuel cell system or the like.

The high-pressure tank 1 includes a cylindrical tank main body 10 having both ends, for example, with a substantially semispherical shape, and a mouthpiece 11 attached to an end of the tank main body 10 in a longitudinal direction. It is to be noted that in the present description, a substantially semispherical part is referred to as a dome part, a cylindrical trunk part is referred to as a straight part, and the parts are denoted with marks 1d and 1s, respectively (see FIG. 1, FIG. 2, etc.). Moreover, the high-pressure tank 1 according to the present embodiment has the mouthpieces 11 at both ends, but for the convenience of the description, the tank is described with reference to FIG. 3 showing a main section of the high-pressure tank 1 in which a positive direction of an X-axis (a direction shown by an arrow) is a tip side and a negative direction thereof is a base side. The positive direction (the direction shown by an arrow) of a Y-axis which is vertical to the X-axis indicates a tank outer peripheral side.

The tank main body 10 includes a wall layer having, for example, a two-layer structure, and includes a liner 20 as an inner wall layer and, for example, an FRP layer 21 as a resin fiber layer (a reinforcing layer) which is an outer wall layer outside the liner. The FRP layer 21 is formed by, for example, an only carbon fiber reinforced plastics (CFRP) layer 21c, or the CFRP layer 21c and a glass fiber reinforced plastics (GFRP) layer 21g (see FIG. 1).

The liner 20 is formed into almost the same shape as the tank main body 10. The liner 20 is made of, for example, a polyethylene resin, a polypropylene resin, another hard resin or the like. Alternatively, the liner 20 may be a metal liner made of aluminum or the like.

On the tip side of the liner 20 provided with the mouthpiece 11, an inwardly bent folded part 30 is formed. The folded part 30 is folded back toward the inside of the tank main body 10 so that the folded part is disposed away from the outside FRP layer 21. The folded part 30 has a tapered portion 30a having a diameter which gradually decreases closer to a folding tip, and a cylindrical portion 30b connected to the tip of the tapered portion 30a and having a constant diameter. The cylindrical portion 30b forms an opening of the liner 20.

The mouthpiece 11 has a schematically cylindrical shape, and is fitted into the opening of the liner 20. The mouthpiece 11 is made of, for example, aluminum or an aluminum alloy, and manufactured into a predetermined shape by, for example, a die cast process or the like. The mouthpiece 11 is fitted into a divided liner formed by injection. Moreover, the mouthpiece 11 may be attached to the liner 20 by, for example, insert forming.

Moreover, in the mouthpiece 11, for example, a valve fastening flange 11a is formed on the tip side (outside the high-pressure tank 1 in an axial direction), and an annular recess portion 11b is formed behind the valve fastening flange 11a (inside the high-pressure tank 1 in the axial direction) with respect to the axis of the high-pressure tank 1. The recess portion 11b is curved to project on an axis side and has an R-shape. The recess portion 11b comes in contact with the vicinity of the tip of the FRP layer 21 having the same R-shape in an airtight manner.

For example, the surface of the recess portion 11b which comes in contact with the FRP layer 21 is provided with solid lubrication coating C such as a fluoric resin. This decreases a friction coefficient between the FRP layer 21 and the recess portion 11b.

Further behind the recess portion 11b of the mouthpiece 11, there is formed a collar portion 11c adapted to, for example, the shape of the folded part 30 of the liner 20 and having, for example, a large diameter continuously with the recess portion 11b, and behind the collar portion 11c, there is formed a mouthpiece cylindrical portion 11d having a predetermined diameter. The tapered portion 30a of the folded part 30 of the liner 20 comes in contact closely with the surface of the collar portion 11c, and the cylindrical portion 30b comes in contact closely with the surface of the mouthpiece cylindrical portion 11d. Between the cylindrical portion 30b and the mouthpiece cylindrical portion 11d, seal members 40 and 41 are interposed.

A valve assembly 50 controls supply/discharge of a fuel gas between an external gas supply line (a supply path 22) and the inside of the high-pressure tank 1. Seal members 60 and 61 are interposed between the outer peripheral surface of the valve assembly 50 and the inner peripheral surface of the mouthpiece 11.

The FRP layer 21 is formed, for example, by winding a fiber bundle (a reinforcing fiber bundle) 70 impregnated with a resin around the outer peripheral surface of the liner 20 and the recess portion 11b of the mouthpiece 11 through filament winding forming (FW forming) and hardening the resin. As the resin of the FRP layer 21, for example, an epoxy resin, a modified epoxy resin, an unsaturated polyester resin or the like is used. Moreover, as the fiber bundle 70, a bundle of carbon fibers (CF), metals fiber or the like is used. During the FW forming, while rotating the liner 20 around a tank axis, a guide of the fiber bundle 70 is moved along the tank axial direction, whereby the fiber bundle 70 can be wound around the outer peripheral surface of the liner 20.

Next, there will be described a fiber winding structure for decreasing structural bends of the fiber bundles (e.g. the bundles of carbon fibers CF) 70 in the high-pressure tank 1 (see FIG. 2, etc.).

As described above, the high-pressure tank 1 is formed by winding the fiber bundle (e.g. the carbon fiber bundle) 70 around the outer periphery of the liner 20 and hardening the resin. Here, the winding of the fiber bundle 70 includes hoop winding and helical winding, a hoop layer (denoted with mark 70P in FIG. 4, FIG. 5, etc.) is formed by hoop-wound layers of the resin, and a helical layer (denoted with mark 70H in FIG. 4, FIG. 4, etc.) is formed by helically wound layers, respectively. In the former hoop winding, the fiber bundle 70 is wound around the straight part (the tank trunk part) of the high-pressure tank 1 in the form of a coil spring to tightly wind the corresponding part, and a force for countering a force directed in the Y-axis positive direction (a force to expand to the outside in a diametric direction) is exerted on the liner 20 by a gas pressure. On the other hand, the latter helical winding is a winding way for a main purpose of tightly winding the dome part in a tight winding direction (inwardly in the tank axial direction), and the fiber bundle 70 is wound around the whole high-pressure tank 1 so that the fiber bundle is caught by the dome part, thereby mainly contributing to the enhancement of a strength of the dome part. It is to be noted that an angle (an acute angle) formed by a helix (a screw thread line in a screw) of the fiber bundle 70 wound in the form of the coil spring and the center line (a tank axis 12) of the tank 1 is "the winding angle with respect to the tank axis (12)" of the fibers 70 mentioned in the present description and denoted with mark α in FIG. 2 (see FIG. 2).

Figure 2:
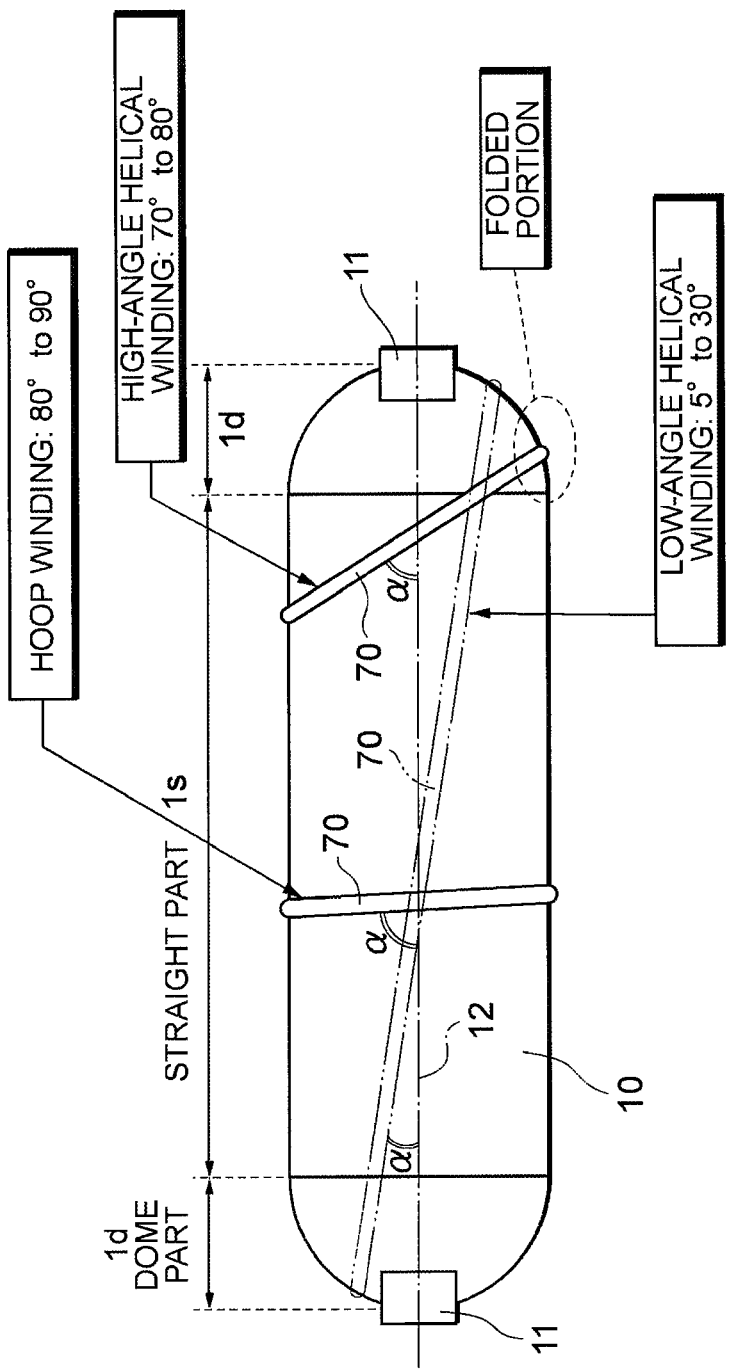
FIG. 2 is a sectional view of the structure of the tank in the embodiment of the present invention.
Figure 3:
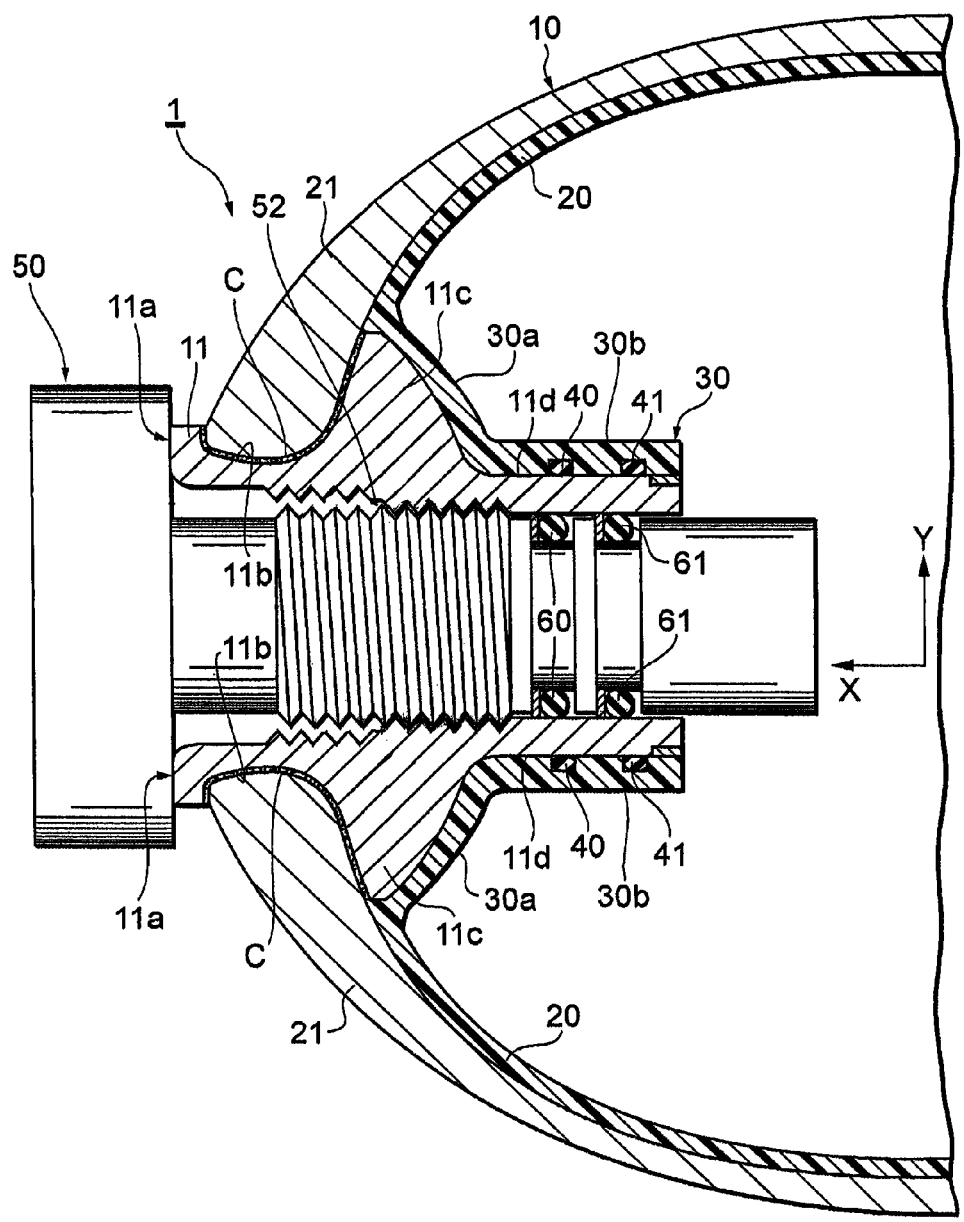
FIG. 3 is a sectional view showing a structure example around a mouthpiece of the tank.

In the hoop winding among these various winding ways, the fiber bundle 70 is wound around the straight part almost vertically to the tank axis, and in this case, a specific winding angle is, for example, from 80 to 90° (see FIG. 2). The helical winding (or impress winding) is a winding way of also winding the fiber bundle 70 around the dome part, and the winding angle with respect to the tank axis is smaller than in the hoop winding (see FIG. 2). The helical winding is roughly divided into two types of high-angle helical winding and low-angle helical winding, and in the high-angle helical winding in the two types, the winding angle with respect to the tank axis is comparatively large, and a specific example of the winding angle is from 70 to 80°. On the other hand, in the low-angle helical winding, the winding angle with respect to the tank axis is comparatively small, and a specific example of the winding angle is from 5 to 30°. It is to be noted that in the present description, helical winding with a winding angle of 30 to 70° which is an angle between the above angles is referred to as medium-angle helical winding sometimes. Furthermore, helical layers formed by the high-angle helical winding, the medium-angle helical winding and the low-angle helical winding are referred to as a high helical layer, a medium helical layer (denoted with mark 70MH) and a low helical layer (denoted with mark 70LH), respectively. Moreover, a folded portion of the dome part 1d of the high-angle helical winding in the tank axial direction is referred to as a folded portion (see FIG. 2).

Usually, in the hoop winding itself, the fiber bundles 70 are spirally wound while the fiber bundles are disposed adjacent to each other, and in the winding way, the fiber bundles can be wound so that the fiber bundles 70 are prevented from being overlapped, to prevent unevenness from being generated. On the other hand, the helical winding is usually performed for the main purpose of tightly winding the dome part, and in the winding way, it is difficult to decrease the overlap of the fiber bundles 70 with one another and the unevenness, or the decreasing of these defects is not sufficiently taken into consideration. The hoop winding and the helical winding are appropriately combined in accordance with specifications such as an axial length, a diameter and the like of the high-pressure tank 1, and the hoop layer 70P and the helical layer 70H are laminated around the liner 20 (see FIG. 1, etc.). At this time, when the helical layer 70H is disposed adjacent to the hoop layer 70P, the unevenness of the helical layer 70H is transferred to the hoop layer 70P, and bends (undulations) are generated in the fiber bundles 70 of the hoop layer 70P sometimes.

Figure 4:
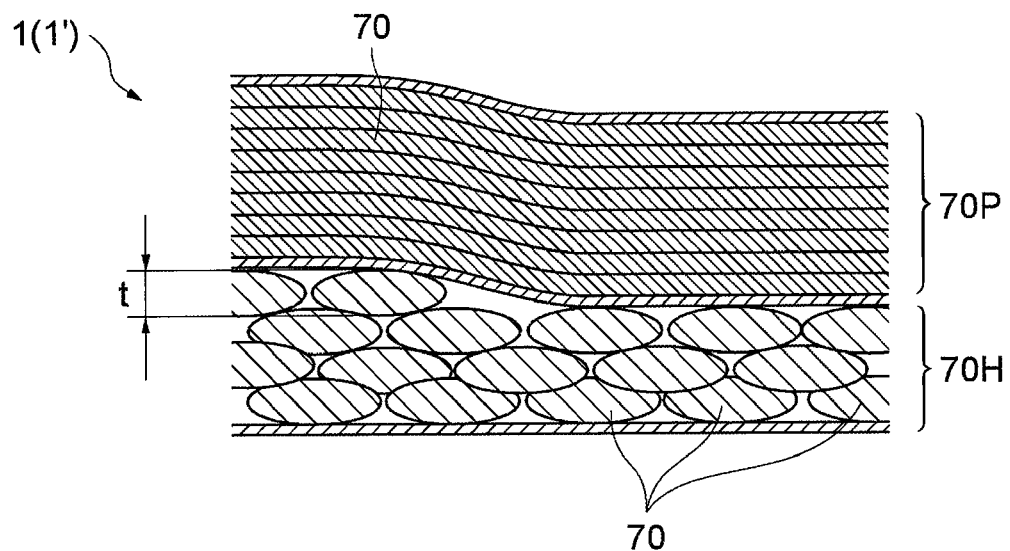
FIG. 4 is a partially enlarged view showing a structure example of a helical layer and a hoop layer of an FRP layer.
Figure 5:
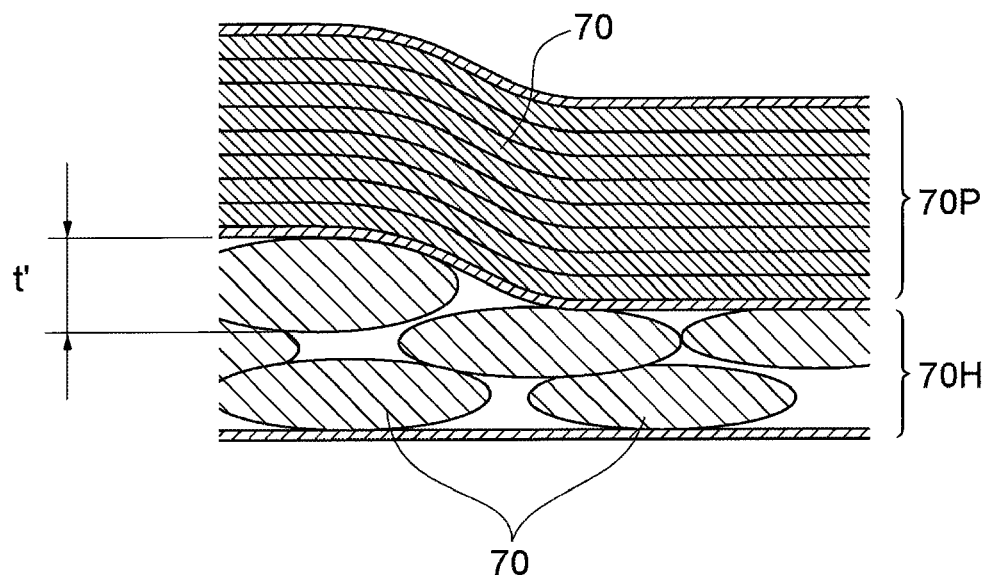
FIG. 5 is a partially enlarged view showing, as a reference, a structure example of a helical layer and a hoop layer of an FRP layer in a conventional tank.
Figure 6:
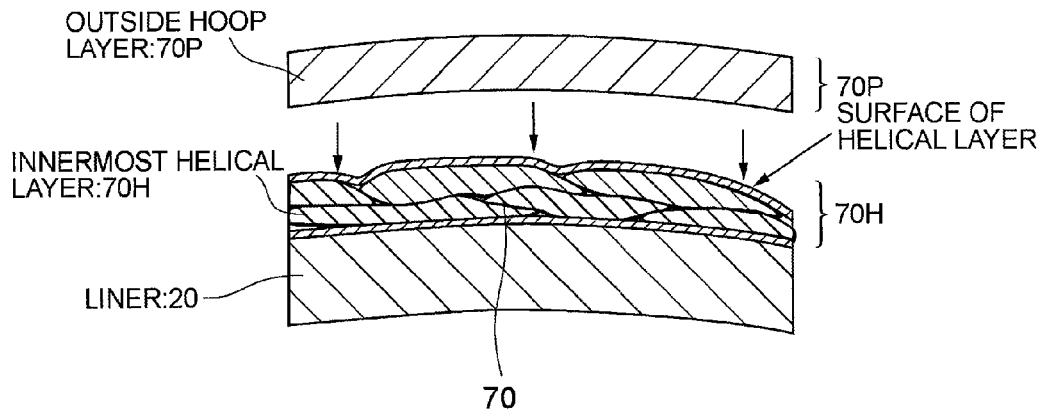
FIG. 6 is a partially enlarged view showing, as a reference, a structure example of an innermost helical layer and a hoop layer outside the helical layer in the FRP layer of the conventional tank.

In this respect, the present embodiment relates to at least one helical layer 70H among a plurality of helical layers 70H positioned in an inner layer of the FRP layer 21, in which a sectional area of the fiber bundle 70 constituting the helical layer 70H is set to be smaller than that of the fiber bundle 70 constituting another layer formed outside the helical layer 70H (see FIG. 4). In this case, any of the plurality of helical layers 70H positioned in the inner layer can be set as an object, but among these objects, the innermost helical layer (the helical layer closest to the liner 20) 70H is preferably set as the object (see FIG. 6).

Figure 11:
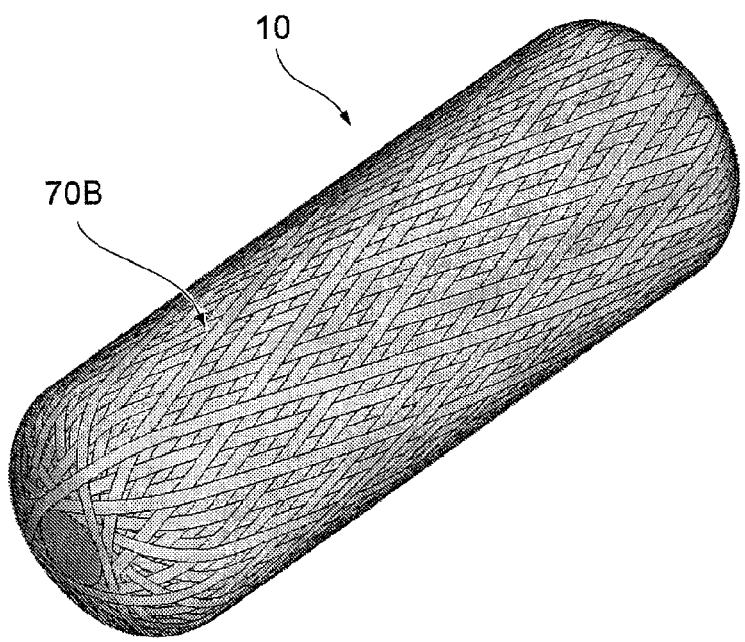
FIG. 11 is a perspective view showing an example of conventional helical winding as a reference.
Figure 12:
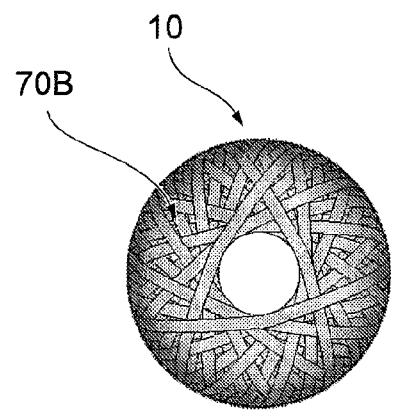
FIG. 12 is a projected diagram along a tank axis direction, showing the example of the conventional helical winding as the reference.

When the sectional area of the fiber bundle 70 constituting the helical layer 70H which is at least one (preferably the innermost helical layer) of the plurality of helical layers 70H positioned in the inner layer of the FRP layer 21 is decreased in this manner, the following function and effect can be obtained. That is, when the helical layer 70H is formed by using the fiber bundle 70 having the small sectional area, a thickness t of the fiber bundle 70 itself becomes smaller than a conventional thickness t' (see FIG. 4 and FIG. 5). Moreover, the wound fiber bundle 70 has a flattened sectional shape owing to a tensile force, a pressure from another layer, or the like during the winding. Furthermore, since the sectional area is small, a space between the fiber bundles 70 is made smaller than before (see FIG. 4). Therefore, unevenness in the surface of the helical layer 70H constituted of the fiber bundle 70 becomes small, and hence it is possible to prevent the unevenness from being transferred to another layer (in the present embodiment, the hoop layer 70P) formed outside the helical layer 70H (see FIG. 4). In consequence, it is possible to decrease conventional structural bends of the fiber bundle due to an uneven helical layer (indicating the helical layer which is not subjected to any treatment for smoothing the surface thereof and has the unevenness occurring on the surface, as denoted with mark 70B in FIG. 11 and FIG. 12). Therefore, the structural bends (undulations) of the fiber bundle 70 of the layer (in the present embodiment, the hoop layer 70P) formed outside the helical layer 70H are suppressed, and a fatigue strength of the fiber bundle 70 itself can be enhanced. Specifically, in the conventional helical layer 70P, the fiber bundles 70 having a comparatively large sectional area overlap with one another, so that the surface of the helical layer 70P is not smooth sometimes (see FIG. 6), but in the present embodiment, the surface of the helical layer 70H can be more smooth (see FIG. 4). Additionally, in the present embodiment, the structural bends (undulations) of the hoop layer 70P formed outside the helical layer 70H are apparently smaller than before (see FIG. 4 and FIG. 5). Furthermore, the helical layer 70H itself and the layer formed outside the helical layer 70H (in the present embodiment, the hoop layer 70P) have a decreased thickness and an increased density to obtain a high Vf, whereby a burst strength can be enhanced. It is to be noted that Vf indicates a fiber volume content ratio. When the value (Vf value) increases, the content ratio of the fibers becomes high, and the content ratio of the resin becomes small. If the value of Vf is excessively high, fatigue durability deteriorates. If the value is excessively lowered, the outer shape of the tank becomes large.

Additionally, in the present embodiment, the innermost layer (the innermost helical layer 70H) of a plurality of helical layers 70H positioned in the inner layer is set as the object, and hence the tank strength can more noticeably be enhanced. That is, usually, in the hoop layer 70P and the helical layer 70H formed by winding the fiber bundles 70 (especially, the hoop layer 70P), the layer positioned on an inner side (i.e., the layer closer to the liner 20) has a larger degree of contribution to the tank strength. Therefore, when the innermost helical layer 70H is constituted of the fiber bundle 70 having a small sectional area as described above, the layer adjacent to the outside of the innermost helical layer 70H (in the present embodiment, the hoop layer 70P) can more smoothly be wound. In consequence, the structural bends (undulations) of the fiber bundle 70 constituting the hoop layer 70P are suppressed, which can further contribute to the enhancement of the tank strength.

It is to be noted that "the inner layer" mentioned in the present description is the layer closer to the liner 20 in a case where the FRP layer 21 is divided into a plurality of layers. For example, in the present embodiment, when the FRP layer 21 is divided into three layers having substantially the same thickness 1/3, the layer on the inner side is referred to as the inner layer. Moreover, the layer on an outer side is referred to as the outer layer, and an intermediate layer is referred to as the middle layer. In Table 1 and Table 2 described later, the layers are described as "outer", "middle" and "inner".

Moreover, when the sectional area of the fiber bundle 70 is decreased as described above, the sectional area can be changed, for example, by changing the number of the fibers constituting the fiber bundle 70. Specifically, in the helical layer 70H positioned in the inner layer of the FRP layer 21, the fiber bundle (a small tow) 70 having a smaller number of the fibers is used, and in the other layers (the helical layers 70H of the middle layer and the outer layer and the hoop layers 70P of all the layers), a fiber bundle (a large tow) having a larger number of the fibers is used, whereby the surface of the helical layer 70H as the object can further be smoothed. A configuration of the arrangement of the fiber bundles 70 will be illustrated and described as follows (see Table 1 and Table 2).

In Table 1 described hereinafter, the fiber bundle 70 constituted of 6 k (6,000) fibers is used in the helical layer 70H positioned in the inner layer of the FRP layer 21, and the fiber bundle 70 constituted of 12 k (12,000) fibers is used in the other layers (the helical layers 70H of the middle layer and the outer layer and the hoop layers 70P of all the layers). In this case, the sectional area of the fiber bundle 70 may be decreased in all the helical layers 70H positioned in the inner layer, or the sectional area of the fiber bundle 70 may be decreased in part of the helical layers.

TABLE 1

Arrangement Example 1 of Fiber Bundles

| | Helical | Hoop |
|---|---|---|
| Outer 1/3 layer | 12k | 12k |
| Middle 1/3 layer | 12k | 12k |
| Inner 1/3 layer | 6k | 12k |

Moreover, in Table 2 described hereinafter, the fiber bundle 70 constituted of 12 k (12,000) fibers is used in the helical layer 70H positioned in the inner layer of the FRP layer 21, and the fiber bundle 70 constituted of 24 k (24,000) fibers is used in the other layers (the helical layers 70H of the middle layer and the outer layer and the hoop layers 70P of all the layers). Also in this case, the sectional area of the fiber bundle 70 may be decreased in all the helical layers 70H positioned in the inner layer, or the sectional area of the fiber bundle 70 may be decreased in part of the helical layers. The sectional area can appropriately be changed in this manner.

TABLE 2

Arrangement Example 2 of Fiber Bundles

|  | Helical | Hoop |
| --- | --- | --- |
| Outer ⅓ layer | 24k | 24k |
| Middle ⅓ layer | 24k | 24k |
| Inner ⅓ layer | 12k | 24k |

The above-mentioned configuration of the arrangement of the fiber bundles 70 is merely illustration, and the number of the fibers may appropriately be changed. However, for smoothing the surface of the helical layer 70H which is the object to sufficiently develop the above function and effect, the sectional area of the fiber bundle 70 of the helical layer 70H as the object is preferably ⅔ or less of the sectional area of the fiber bundle 70 in the other layers. In other words, the number of the fibers of the fiber bundle 70 in the layers other than the object is preferably selected so that the number is 1.5 or more times the number of the fibers of the fiber bundle 70 of the helical layer 70H which is the object, to arrange the fiber bundles 70.

Figure 10:
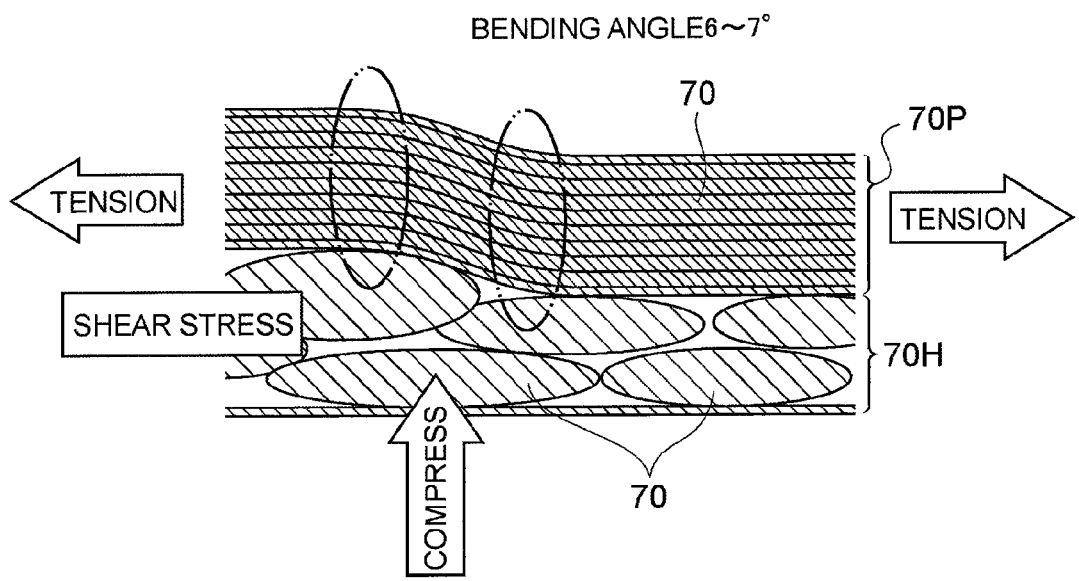
FIG. 10 is a diagram showing, as a reference, a structure example of the helical layer and a hoop layer in the conventional tank.

It has been described above that the sectional area of the fiber bundle 70 in part of the helical layers 70H is decreased, but the surface of the helical layer 70 can be smoothed by another means. For example, when a tensile force onto the fiber bundle constituting the helical layer 70H is increased, the thickness of the fiber bundle 70 in a laminating direction of the FRP layer 21 can be decreased. In such a case, the fiber bundle 70 spreads in a width direction to have a flatter state, a stepped portion, accordingly, becomes small, and the surface of the helical layer 70H becomes smoother. Heretofore, owing to an influence of unevenness of the surface of the helical layer 70H, a shear stress has been generated by the bend of the fiber bundle 70 of the layer (e.g. the hoop layer) outside the helical layer 70H (see a part surrounded with an imaginary line in FIG. 10), breakdown has proceeded, and the fatigue strength might lower. According to the present embodiment, however, such an influence is suppressed, so that the deterioration of the fatigue strength can be avoided.

Figure 7:
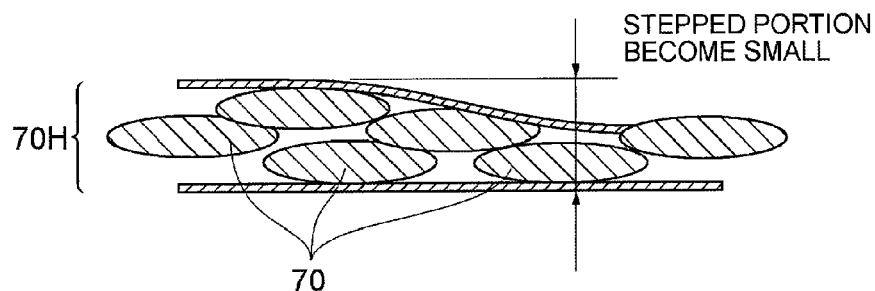
FIG. 7 is a diagram showing a sectional shape example of a helical layer in another embodiment of the present invention.
Figure 8:
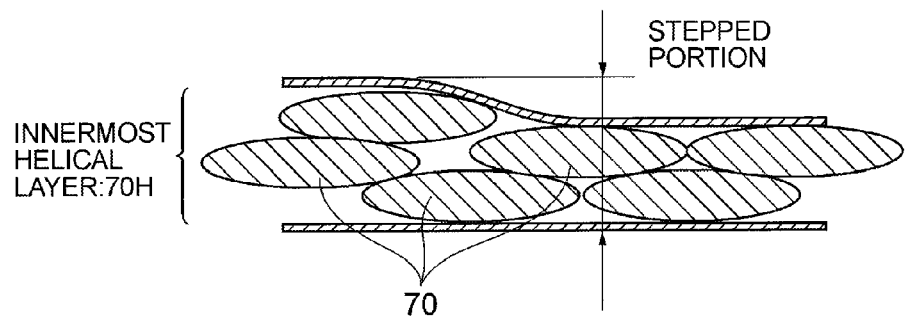
FIG. 8 is a diagram showing, as a reference, a sectional shape example of a helical layer in a conventional tank.

For example, in another embodiment of the present invention shown in FIG. 7 and the like, a tensile force onto the fiber bundle 70 is about 20 N in the present situation (see FIG. 8), but the tensile force onto the fiber bundle 70 of the innermost helical layer 70H is increased to about 40 to 50 N (see FIG. 7). In such a case, the fiber bundle 70 more tightly wound with the increase of the tensile force has a further flattened sectional shape to decrease a thickness thereof (the thickness t'→t). In consequence, the surface of the helical layer 70H has a smaller stepped portion, and become smoother (see FIG. 7). For example, when the tensile force is increased from 20N to about 40 to 50 N as described above, the thickness of the fiber bundle 70 and the thickness of the helical layer 70H are decreased as much as about 20%, and the unevenness is decreased, whereby the surface can further be smoothed.

Figure 9:
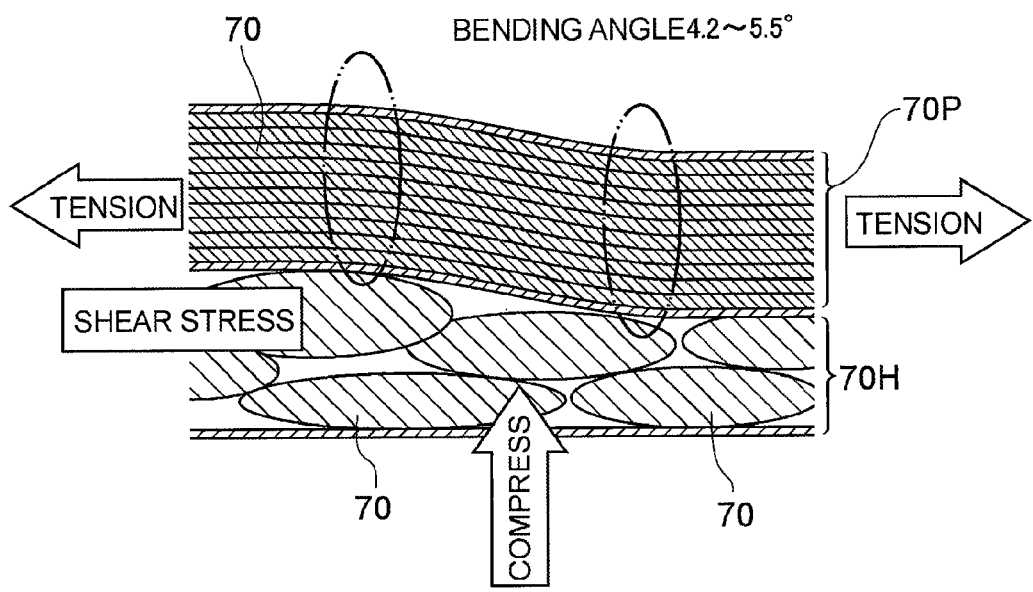
FIG. 9 is a diagram showing a structure example of a helical layer and a hoop layer in still another embodiment of the present invention.

Moreover, when the tensile force is increased as described above to smooth the helical layer 70H, a linear diameter of the fiber bundle 70 of the layer formed outside the helical layer 70H is preferably increased. When the fiber bundle diameter of the other layer (e.g. the hoop layer 70P) formed outside the helical layer H is increased as much as, for example, from 20 to 30% in this manner, bend displacement in the fiber bundle is decreased, so that the shear stress can be alleviated (see FIG. 9). An example will be described. Heretofore, for example, a bend angle from 6 to 7° has been generated in the hoop layer 70P outside the helical layer 70H owing to the influence of the unevenness of the helical layer 70H (see FIG. 10), but the bend angle can be decreased to about 4.2 to 5.5° only by increasing the linear diameter of the fiber bundle 70 of the hoop layer 70P (see FIG. 9). That is, when the linear diameter of the fiber bundle 70 of the hoop layer 70P is increased in this manner, rigidity per fiber lowers. Therefore, even when the same force is applied, a bending angle becomes small, and the bend angle decreases.

Figure 13:
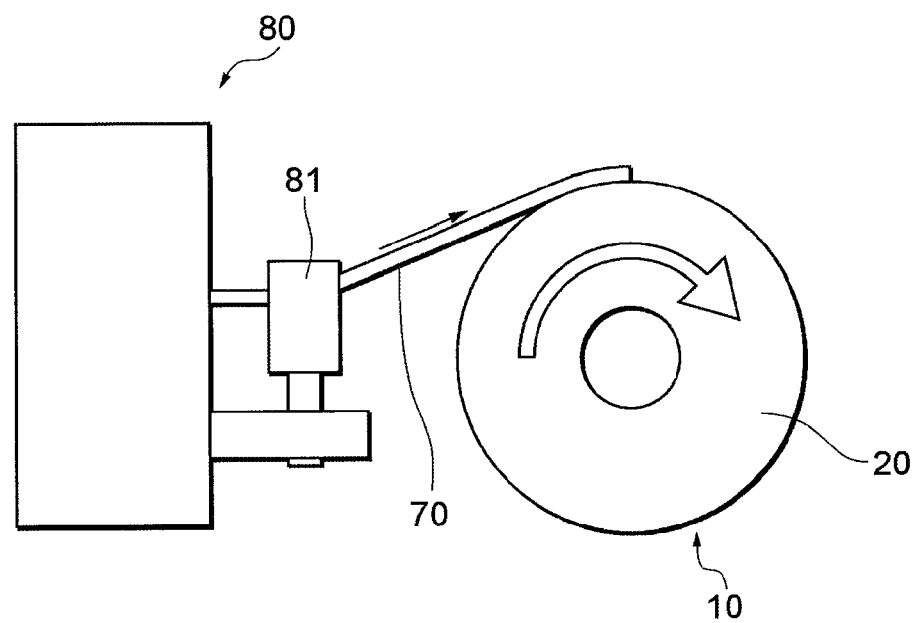
FIG. 13 is a diagram showing an example of a filament winding (FW) device.
Figure 14:
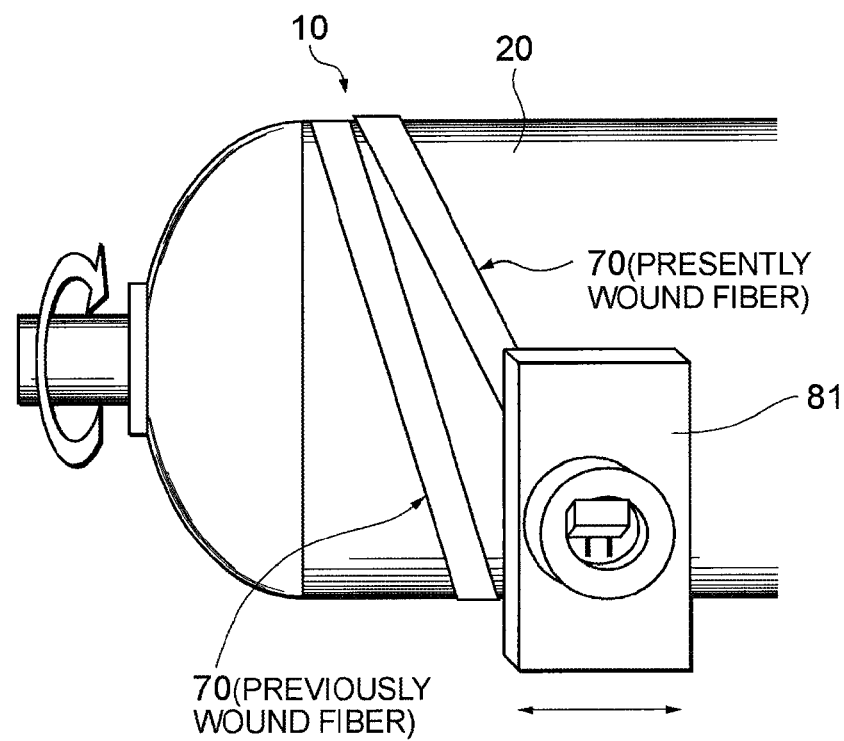
FIG. 14 is a diagram showing a behavior of winding fiber bundles around the outer periphery of a liner by use of a fiber guide unit of the FW device.

It is to be noted that hereinafter, an example of a filament winding (FW) device for winding the fiber bundle 70 will briefly be described. In an FW device 80 shown in FIG. 13 and FIG. 14, while rotating the liner 20 around the tank axis, a guide unit (referred to as "a dagger" or the like) 81 of the fiber bundle 70 is reciprocated along the tank axial direction to wind the fiber bundle 70 around the outer periphery of the liner 20. When a relative speed of movement of the guide unit 81 with respect to a rotation number of the liner 20 is changed, a winding angle of the fiber bundle 70 can be changed. The guide unit 81 is supported operably by, for example, a jig.

As described above, in the present embodiment, the unevenness of the surface of the helical layer 70H is decreased, whereby the unevenness or structural bend which might be transferred to the layer (e.g., the hoop layer 70P) adjacent to the outside of the helical layer 70H is decreased, so that the deterioration of the fatigue strength can be avoided. In this case, the above-mentioned constitution of the helical layer 70H using the fiber bundle 70 having a smaller number of the fibers and a comparatively small sectional area, the increasing of the tensile force onto the fiber bundle 70 to decrease the thickness t of the fiber bundle 70, or the like is effective as means for decreasing the unevenness of the surface of the helical layer 70H. Moreover, a winding amount of the fibers per unit time is increased, whereby productivity of the high-pressure tank 1 can be enhanced.

Moreover, needless to say, the smooth helical layer 70H itself, and the hoop layer 70P adjacent to this layer have a high fiber volume content ratio (Vf), and the resin, accordingly, accumulates less, whereby an amount of the resin for use in the FRP layer 21 decreases. When the amount of the resin decreases in this manner, the weight saving of the high-pressure tank 1 can be achieved as much as the decrease.

Furthermore, when the FRP layer 21 has a high Vf and the amount of the resin decreases as described above, an amount of hardening heat to be generated (the generation of the heat due to reaction heat during the thermal hardening of the resin) decreases. Usually, when peak temperature during the thermal hardening is high, a problem such as bonding (after the FW forming and the resin hardening, the liner 20 and the FRP layer 21 are partially or entirely bonded) or liner material deterioration might occur. However, these problems can be suppressed in the high-pressure tank 1 of the present embodiment which can decrease the amount of the hardening heat to be generated in this manner.

In addition, the present embodiment also has an advantage that the tank strength can noticeably be enhanced. That is, the decreasing of the structural bends of the fiber bundle 70 of the hoop layer 70P preferably contributes to the enhancement of the fatigue strength of the straight part 1s of the high-pressure tank 1. Moreover, the decreasing of the structural bends of the fiber bundle 70 of the helical layer 70H preferably contributes to the enhancement of the fatigue strength of the dome part 1*d* of the high-pressure tank 1. Usually, in both the helical layer 70H and the hoop layer 70P, the layer positioned on the inner side (the layer closer to the liner 20) has a larger degree of contribution to the tank strength, and the innermost hoop layer 70P has a large function especially in that the straight part 1*s* is tightly wound to exert a sufficient pressure resistance. In this respect, according to the above embodiment, when at least the surface of the innermost helical layer 70H is formed to be smooth, the layer (e.g. the hoop layer 70P) adjacent to the outside of the smooth helical layer 70H can smoothly be formed, and the layer (e.g. the hoop layer 70P) can noticeably contribute to the enhancement of the tank strength.

It is to be noted that the above embodiments are an example of the preferable embodiment of the present invention, but the present invention is not limited to this example, and can variously be modified without departing from the scope of the present invention. For example, in the above embodiments, there has been described the case where the innermost helical layer 70H is formed as the smooth helical layer (the innermost smooth helical layer), but in view of various functions and effects in the case where the smooth helical layer 70H is formed, a treatment to form the surface of the other helical layer 70H into a smooth surface is preferably performed. Moreover, when the helical layer 70H in the middle layer or the outer layer is smoothed, the above function and effect can similarly be realized also in the helical layer 70H.

Moreover, in the above embodiment, the case where the layer outside the helical layer is the hoop layer 70P has mainly be described (see FIG. 4, etc.), but the present invention can be applied to a case where the layer outside the helical layer 70H is the helical layer 70H.

Furthermore, in the above embodiments, there has been described illustration of a case where the present invention is applied to a hydrogen tank which can be utilized in a fuel cell system or the like, but needless to say, the present invention can be applied to a tank to be filled with a fluid other than a hydrogen gas.

Additionally, the present invention can be applied to a member other than the tank (the pressure container), for example, a cylindrical member (including a cylindrical portion) such as a long member or structure including the FRP layer. An example will be described. When the FRP layer 21 including the helical layers 70H or the hoop layers 70P is formed by winding the fiber bundles 70 around the outer side of an axle (e.g. a mandrel or the like) or a mold through the helical winding or the hoop winding, the smooth helical layer 70H is formed. In this case, the structural bends of the fiber bundles 70 are decreased, the fatigue strength is enhanced, and the thickness of each layer is decreased. In this manner, a function and an effect can be realized in the same manner as in the above embodiments.

Moreover, when the present invention is applied to a cylindrical member 1' in this manner, the layer adjacent to the hoop layer is formed as another hoop layer 70P or the smooth helical layer 70H in one of preferable configurations. Alternatively, the layer adjacent to the uneven helical layer 70H is formed as the smooth helical layer in another preferable configuration. It is to be noted that specific examples of the cylindrical member 1' include a sporting equipment such as a shaft of a golf club or a carbon bat, leisure goods such as a fishing rod, an engineering product such as a plant facility and a structure such as a construction material.

INDUSTRIAL APPLICABILITY

The present invention is preferably applied to a tank having an FRP layer, and further to a cylindrical member such as a long member or a structural member.

DESCRIPTION OF REFERENCE NUMERALS

1 . . . high-pressure tank (tank), 1' . . . cylindrical member, 20 . . . liner, 21 . . . FRP layer, 70 . . . fiber bundle, 70H . . . helical layer, 70P . . . hoop layer, and t and t' . . . thickness of (helical layer 70H).

The invention claimed is:

1. A tank comprising a liner, and a fiber reinforced plastics layer including at least two fiber bundles alternatively formed around the outer periphery of the liner, one fiber bundle of the at least two fiber bundles having at least one hoop layer, and another fiber bundle of the at least two fiber bundles having at least one helical layer,
   wherein the another fiber bundle having the at least one helical layer is wound around a dome portion of the tank,
   wherein the another fiber bundle having the helical layer being positioned in an inner layer of the fiber reinforced plastics layer, having a sectional area that is smaller than that of the at least one fiber bundle having the hoop layer, and having a smaller number of fibers than the at least one hoop layer, and
   wherein a tensile force onto the another fiber bundle constituting the helical layer is increased so as to decrease a thickness of the another fiber bundle in a laminating direction of the fiber reinforced plastics layer so that the sectional area of the another fiber bundle is smaller and more even than that of the at least one fiber bundle having the hoop layer.

2. The tank according to claim 1, wherein the sectional area of the another fiber bundle constituting the helical layer is changed by changing the number of fibers constituting the another fiber bundle.

3. A manufacturing method of a tank including a liner, and an fiber reinforced plastics layer a fiber reinforced plastics layer including at least two fiber bundles alternatively formed around the outer periphery of the liner, one fiber bundle of the at least two fiber bundles having at least one hoop layer, and another fiber bundle of the at least two fiber bundles having at least one helical layer, comprising the steps of:
   winding the another fiber bundle having the at least one helical layer around a dome portion of the tank;
   positioning the another fiber bundle having the helical layer on an inner layer of the fiber reinforced plastics layer;
   increasing a tensile force onto the another fiber bundle constituting the helical layer to decrease a thickness of the another fiber bundle in a laminating direction of the fiber reinforced plastics layer; and
   winding the another fiber bundle having the decreased thickness compared to that of the one fiber bundle constituting the hoop layer so that the another fiber bundle becomes flatter and more even than the one fiber bundle constituting the hoop layer,
   wherein the one fiber bundle having the hoop layer being formed outside the another fiber bundle having the helical layer, and
   wherein the another fiber bundle having a smaller number of fibers than the at least one hoop layer.

4. A cylindrical member comprising a fiber reinforced plastics layer including at least two fiber bundles alternatively formed around the outer periphery of the liner, one fiber bundle of the at least two fiber bundles having at least one hoop layer, and another fiber bundle of the at least two fiber bundles having at least one helical layer,
   wherein the another fiber bundle having the at least one helical layer is wound around a dome portion of the tank,
   wherein the another fiber bundle having the helical layer being positioned in an inner layer of the fiber reinforced plastics layer, and having a sectional area that is smaller than that of the at least one fiber bundle having the hoop layer, and having a smaller number of fibers than the at least one hoop layer, and
   wherein a tensile force onto the another fiber bundle constituting the helical layer is increased so as to decrease a thickness of the another fiber bundle in a laminating direction of the fiber reinforced plastics layer so that the sectional area of the another fiber bundle is smaller and more even than that of the at least one fiber bundle having the hoop layer.

* * * * *